(12) United States Patent
Kabierschke et al.

(10) Patent No.: US 10,174,847 B2
(45) Date of Patent: Jan. 8, 2019

(54) SAW TOOTH DESIGN FOR CONTROL DAMPER

(71) Applicant: Hanon Systems, Daejeon (KR)

(72) Inventors: Detlef Kabierschke, Bergisch Gladbach (DE); Nico Esser, Bergisch Gladbach (DE); Eckart Sievers, Frechen (DE)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 15/439,100

(22) Filed: Feb. 22, 2017

(65) Prior Publication Data

US 2017/0248237 A1  Aug. 31, 2017

(30) Foreign Application Priority Data

Feb. 26, 2016 (DE) .......................... 10 2016 103 399

(51) Int. Cl.
| | |
|---|---|
| *F16K 1/226* | (2006.01) |
| *F24F 13/14* | (2006.01) |
| *F16K 1/16* | (2006.01) |
| *B60H 1/00* | (2006.01) |

(52) U.S. Cl.
CPC ....... *F16K 1/2261* (2013.01); *B60H 1/00678* (2013.01); *F16K 1/165* (2013.01); *F24F 13/1406* (2013.01); *B60H 2001/006* (2013.01); *B60H 2001/00714* (2013.01)

(58) Field of Classification Search
CPC . F16K 1/2261; F16K 1/165; B60H 2001/006; F24F 13/1406; F24F 13/15
USPC ....... 251/305–308, 314–317.01; 137/601.06, 137/601.17; 454/333, 335, 336, 358, 363
See application file for complete search history.

(56) References Cited

U.S. PATENT DOCUMENTS

| | | | | |
|---|---|---|---|---|
| 2,882,010 A | * | 4/1959 | Bryant .................... | F16K 1/226 251/306 |
| 3,298,677 A | * | 1/1967 | Anderson ............. | F02D 9/1015 251/305 |
| 3,565,394 A | * | 2/1971 | Smith .................... | F16K 1/2265 251/151 |
| 3,606,245 A | * | 9/1971 | Reichow et al. ....... | F16K 1/165 137/601.06 |
| 4,193,605 A | * | 3/1980 | Josephson ............... | F24F 13/15 277/642 |
| 4,382,725 A | * | 5/1983 | Dugge ..................... | B61D 7/08 222/485 |
| 4,541,328 A | * | 9/1985 | Brzezinski ............. | F24F 13/15 137/601.11 |

(Continued)

FOREIGN PATENT DOCUMENTS

| | | |
|---|---|---|
| CN | 1112638 A | 11/1995 |
| DE | 19717335 A1 | 11/1997 |

(Continued)

*Primary Examiner* — John Bastianelli
(74) *Attorney, Agent, or Firm* — Shumaker, Loop & Kendrick, LLP; James D. Miller (57) ABSTRACT

A control damper for a housing of an air-handling unit includes a rigid main body rotatable about a first rotational axis. A sealing element extends radially outwardly from a first side of the rigid main body. The sealing element is formed of a resilient material. The sealing element further includes a resilient lip extending outwardly from a distal end thereof. The lip has a first series of undulations formed in an outer edge thereof, wherein the undulations form a wave-shaped profile in the outer edge of the lip.

8 Claims, 5 Drawing Sheets

(56) References Cited

U.S. PATENT DOCUMENTS

| | | | | |
|---|---|---|---|---|
| 4,766,807 A * | 8/1988 | Davis | ............... | F24F 13/1406 137/601.06 |
| 5,580,307 A * | 12/1996 | Arosio | ............... | A62C 2/14 137/601.09 |
| 6,019,679 A * | 2/2000 | Lloyd | ............... | A62C 2/14 454/369 |
| 6,254,475 B1 | 7/2001 | Danieau et al. | | |
| 6,682,413 B1 * | 1/2004 | Hoffman | ............... | B60H 1/248 454/156 |
| 8,226,068 B2 * | 7/2012 | Azar | ............... | F24F 13/1406 251/314 |
| 2009/0253367 A1 * | 10/2009 | Kupferberg | ............... | F24F 13/1406 454/358 |
| 2010/0224253 A1 | 9/2010 | Azar et al. | | |
| 2012/0110909 A1 | 5/2012 | Crane et al. | | |

FOREIGN PATENT DOCUMENTS

| | | | |
|---|---|---|---|
| DE | 19948218 | A1 | 3/2001 |
| DE | 10343476 | A1 | 4/2004 |
| JP | H0728711 | U | 5/1995 |
| JP | 2570855 | A | 1/1997 |
| JP | 2004161243 | A | 6/2004 |
| JP | 2005138629 | A | 6/2005 |
| JP | 2009234285 | A | 10/2009 |
| JP | 2012224153 | A | 11/2012 |
| KR | 20000014002 | A | 3/2000 |
| KR | 20060017127 | A | 2/2006 |

* cited by examiner

SAW TOOTH DESIGN FOR CONTROL DAMPER

CROSS-REFERENCE TO RELATED APPLICATIONS

This application claims priority to German Patent Application No. 10 2016 103399.5 filed on Feb. 26, 2016, the disclosure of which is incorporated herein by reference in its entirety.

FIELD OF THE DISCLOSURE

The instant disclosure relates to a control damper for opening and closing a passageway, and more particularly, to a control damper for opening and closing a passageway in a housing of a heating, ventilation, and air-conditioning (HVAC) system of a motor vehicle, for example, for controlling a flow of air through the housing.

BACKGROUND

A vehicle typically includes a heating, ventilation, and air-conditioning (HVAC) system which maintains a temperature within a passenger compartment of the vehicle at a comfortable level by providing heating, cooling, and ventilation. Comfort is maintained in the passenger compartment by an integrated mechanism referred to in the art as an air-handling unit. The air-handling unit conditions air flowing therethrough and distributes the conditioned air throughout the passenger compartment.

The air-handling unit commonly employs a housing having a network of conduits formed therein. The housing further includes a plurality of control dampers associated with the network of passageways for selectively controlling the flow of the air to various vents within the passenger compartment of the vehicle, depending on an operating mode selected by an occupant of the vehicle. For example, the flow of the air may be selectively provided to a first vent of the passenger compartment by rotatably opening and closing a first one of the control dampers.

In an arrangement for sealing one of the passageways in a housing according to the prior art, the control dampers have sealing elements made of a resilient material, and the housing has what is known as a seal face extending around an entirety of the passageway.

The use of resilient materials, such as polymers, to produce sealing elements is advantageous, as the resilient materials deform elastically under tensile and compressive stress, and afterward, return to the non-deformed state. For example, when the control damper is actuated to close one of the passageways, the sealing element is placed against the circumferential seal face. Any passage of air through the passageway is thereby prevented. Conversely, when the control damper is actuated to open the passageway, the passageway is opened by a release or pulling away of the sealing element from the seal face, thereby enabling the passage of air through the opening.

The sealing elements may be arranged on one or more sides or edges of the control damper. If the control damper is embodied as a door, for example, the sealing elements are provided on three sides of the control damper, while the hinge side of the door-type control damper has a separate sealing means, in most cases.

Sealing elements that are flat in shape, referred to as sealing lips, are known in the prior art. These sealing elements rest with a portion of a surface thereof against the seal face of the housing.

When the flat sealing lips are used to close a passageway, noises can be produced since there is a moment during the closing process when the pressure exerted by the fluid against the sealing lip is greater than the elastic force urging the sealing lip against the seal face. The pressure exerted by the fluid causes the sealing lip to move away from the seal face. The pressure of the fluid then decreases, allowing the seal to return to the position on the seal face. The process repeats continuously, until the spring force of the sealing element is greater than a force generated by the pressure of the fluid.

The repeated process of the rubber sealing lip being on the seal face and caused to move away from the seal face results in a fluttering of the rubber sealing lip, with the concomitant noise generation. The problem of audible noises or perceptible vibrations in motor vehicles or machinery is known as NVH (noise, vibration, harshness). The noises are perceived by passengers in a motor vehicle, for example, as bothersome and unpleasant. Therefore, it is desirable to eliminate the noises to improve passenger comfort.

To reduce the noise generation, various sealing elements that have recesses or cutouts in the edge region of the rubber sealing lip have been utilized. The recesses ameliorate the generation of noise during a closing process by preventing the simultaneous placement of the rubber sealing lip along the seal face. The closing process is completed only when greater contact pressure is achieved by the control damper.

It is a disadvantage of the recesses that, although the recesses in the rubber sealing lip prevent noises, no distinct closing mechanism is provided. The doors are sealed by overpressure, however there is no distinct sealing edge that ensures sealing. Thus, with the recesses, leaks can occur when the arrangement is moved to the closed position.

Figure 1:
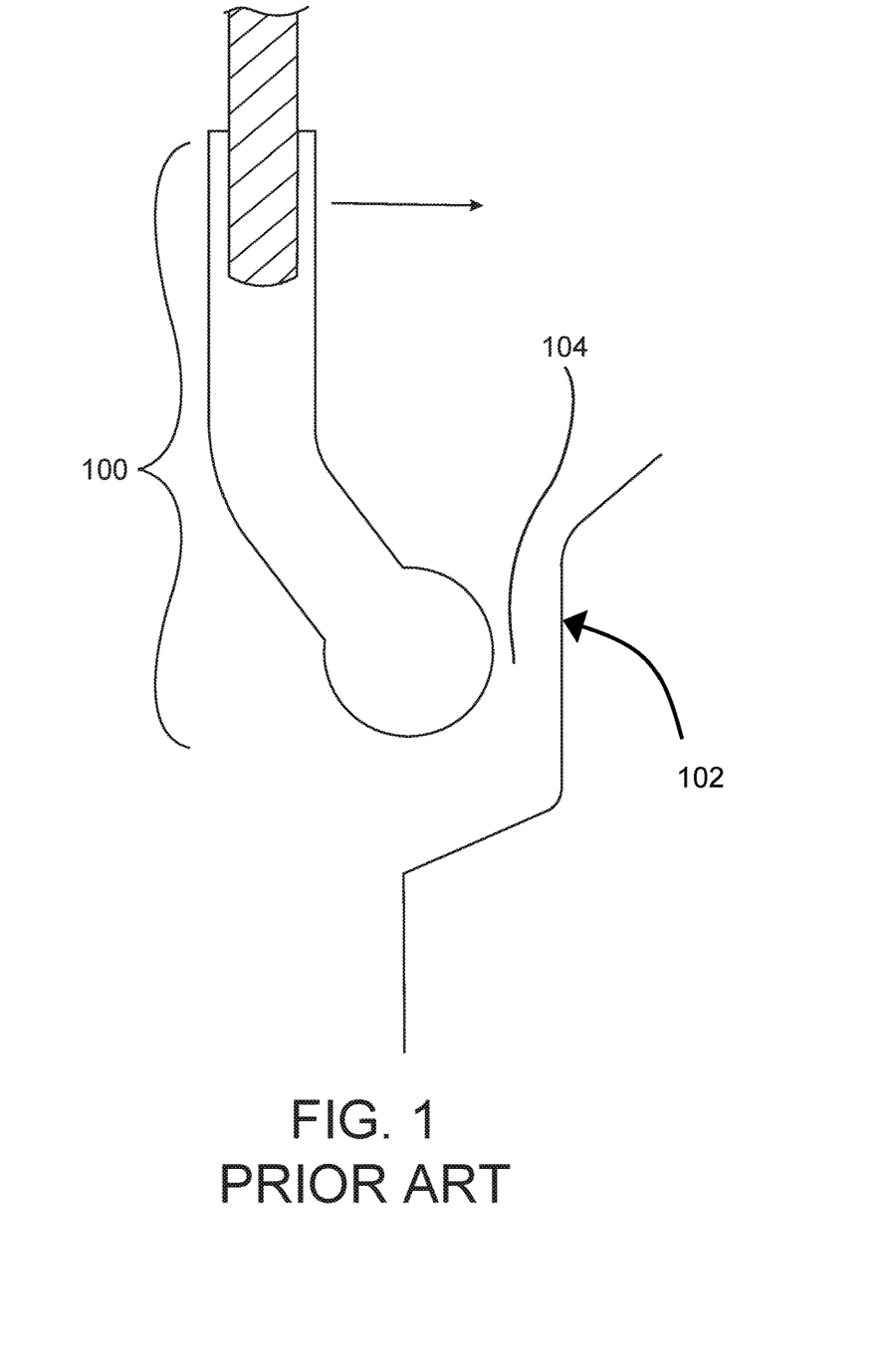
FIG. 1 is an enlarged fragmentary cross-sectional view of the control damper of according to the prior art showing an interface between a sealing element and a seal face of a passageway of a housing.

As shown in FIG. 1, also known from the prior art are embodiments having thickened areas formed at the end of a flat sealing element 100. The thickened areas are designed to reduce noise generation during the closing process, and to improve the seal tightness of the arrangement. Accordingly, the thickened areas may be designed as extending along the seal face of the housing 102 to close off the opening.

A sealing element 100 having the thickened areas may be made from an elastic material and referred to in the art as "frog finger sealing", wherein improved sealing performance is achieved. In particular, a distinct closing edge is formed, and as a result, the tightness of the seal of the structure is improved when the passageway is in the closed position.

The closure of the passageway is achieved by the placement of the thickened end portion of the sealing element 100 against the seal face of the passageway by rotating the control damper in a direction indicated by the arrow in FIG. 1. However, a hissing noise can be generated, particularly when the sealing element leaves a narrow gap 104 between the sealing element 100 and the seal face of the housing 102 just before the final sealing.

Accordingly, there exists a need in the art for a control damper for a passageway capable of minimizing noise during a closing process while simultaneously providing a maximized seal tightness when the control damper is in the closed position.

SUMMARY

In concordance with the instant disclosure, a control damper for a passageway capable of minimizing noise during a closing process while simultaneously providing a maximized seal tightness when the control damper is in the closed position is surprisingly discovered.

In a first embodiment of the disclosure, a control damper for a housing of an air-handling unit includes a rigid main body rotatable about a first rotational axis. A first sealing element extends radially outwardly from a first side of the rigid main body. The first sealing element is formed of a resilient material. The first sealing element further includes a first lip extending outwardly from a distal end thereof. The first lip has a first series of undulations formed in an outer edge thereof.

In another embodiment of the disclosure, an arrangement for a housing of an air-handling unit comprises a first control damper and a second control damper, both disposed within a passageway of the housing. The first control damper is rotatable about a first rotational axis, and has a first sealing element extending radially outwardly from the first rotational axis in a first direction. The first sealing element includes a first resilient lip having a series of undulations formed therein. The second control damper is rotatable about a second rotational axis, the second rotational axis parallel to the first rotational axis. The second control damper including a seal face extending radially outwardly from the second rotational axis in a second direction, the second direction opposite the first direction. The first sealing element of the first control damper is configured to engage the seal face of the second control damper when the first control damper and the second control damper are both rotated in a first direction to a closed position.

In yet another embodiment of the disclosure, an arrangement for a housing of an air-handling unit comprises a first control damper and a second control damper, both disposed within a passageway of the housing. The first control damper is rotatable about a first rotational axis, and has a sealing element extending radially outwardly from the first rotational axis in a first direction. The first sealing element further includes a first resilient lip having a series of undulations formed therein. The second control damper is rotatable about a second rotational axis, the second rotational axis parallel to the first rotational axis. The second control damper includes a second sealing element extending radially outwardly from the second rotational axis in a second direction, opposite the first direction. The second sealing element includes a second resilient lip having a series of undulations formed therein. The first sealing element of the first control damper is configured to cooperate with the second sealing element of the second control damper when each of the first control damper and the second control damper are rotated in a first direction.

DETAILED DESCRIPTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 2:
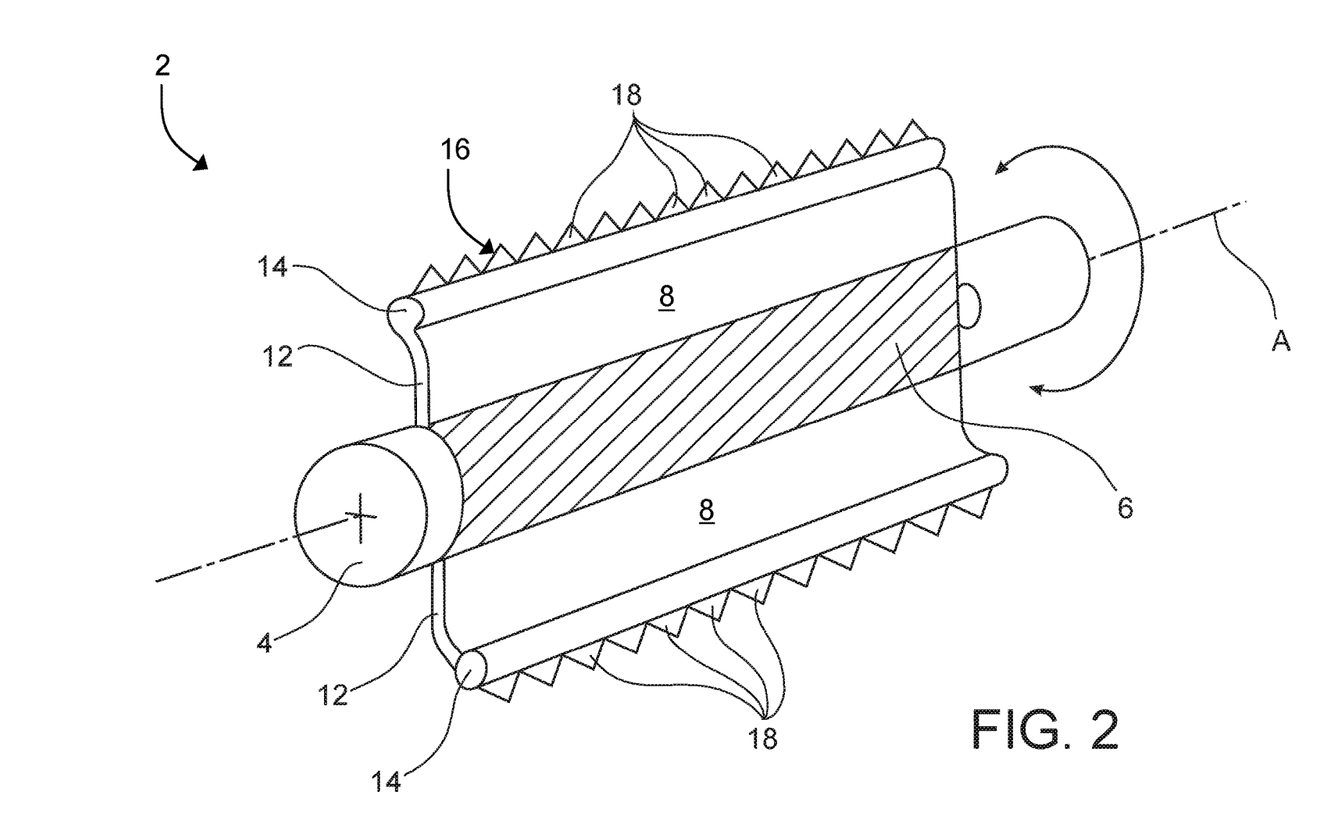
FIG. 2 is a top-front perspective view of a control damper according to an embodiment of the instant disclosure.
Figure 3:
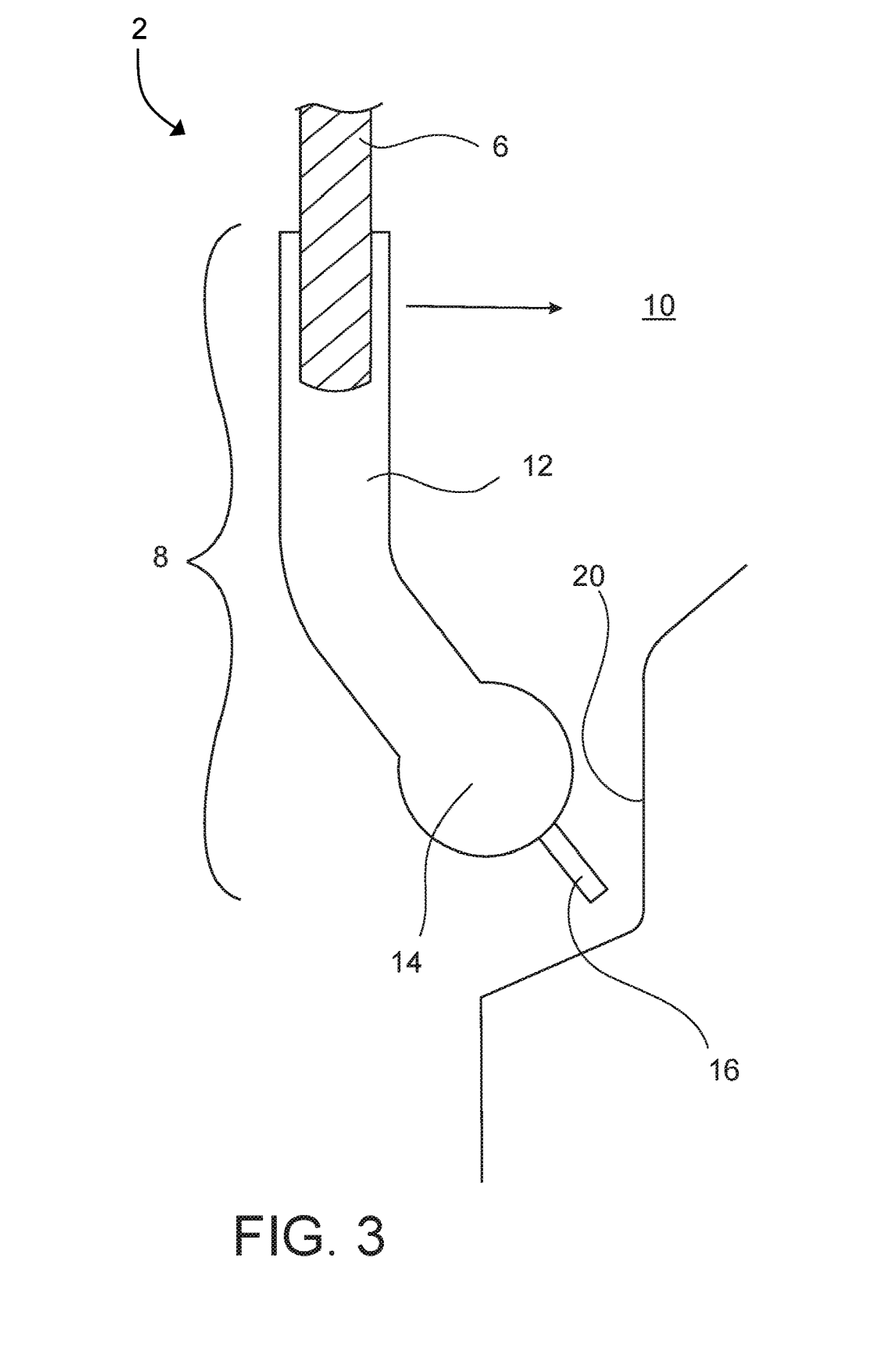
FIG. 3 is an enlarged fragmentary cross-sectional view of the control damper of FIG. 4, showing an interface between a sealing element and a seal face of a passageway of a housing.

FIGS. 2 and 3 show a control damper 2 according to an embodiment of the instant disclosure. The control damper 2 includes a shaft 4, a main body 6, and one or more sealing elements 8. As shown in FIG. 2, the control damper 2 is rotatable about a rotational axis A. Control dampers 2 of this type can be rotated in the directions indicated by the double arrow. The control damper 2 is configured to be rotatably received within a passageway 10 of a housing for an air-handling unit (not shown).

The shaft 4 defines the rotational axis A of the control damper 2, and is configured to be rotatably mounting in the housing. In the illustrated embodiment, the control damper 2 is symmetrically formed about the rotational axis A, wherein the shaft 4 and the main body 6 are disposed intermediate an outwardly-extending, opposing pair of the sealing elements 8. Accordingly, as shown in FIG. 2, the shaft 4 functions as a central hub of the control damper 2. Alternatively, the control damper 2 may be embodied as a flap, wherein the shaft 4 is disposed on a first side of the main body 6 and the sealing element 8 extends from an opposing second side of the main body 6.

As shown in FIG. 3, each of the sealing elements 8 is subdivided into a first sub-region 12 and a second sub-region 14. The first sub-region 12 is connected to an outer edge of the main body 6. The second sub-region 14 extends outwardly from the first sub-region 12, and has a thickness greater than the first sub-region 12, for example, in the form of a bead. In the illustrated embodiment, the first sub-region 12 has an arcuate portion formed in an intermediate portion thereof, and the second sub-region 14 has a circular or oval cross-section. In alternate embodiments, the first sub-region 12 may be entirely arcuate or substantially planar and the second sub-region 14 may have any cross-sectional shape, such as a polygonal cross-section. The alternate embodiments have no impact on the function of the control damper 2 with respect to sealing the passageway 10 of the housing.

To prevent noise generation, the second sub-region 14 further includes a resilient lip 16 extending radially outwardly therefrom as shown in FIGS. 2 and 3. The lip 16 is attached directly to a distal portion of the second sub-region 14. In alternate embodiments, the lip 16 may also be attached in an offset position in relation to the drawing of FIG. 3, within a tolerance range defined by the functioning of the control damper 2.

The lip 16 includes a series of undulations 18 formed in a distal edge thereof, wherein an extension length of the lip 16 with respect to the second sub-portion 12 is variable in a direction parallel with the axis A. As shown in FIG. 2, the undulations 18 of the lip 16 may form a substantially wave-shaped or saw tooth profile. The wave-shaped profile formed by the undulations 18 is not fixedly defined by the disclosure, and may be adapted, for example, based on production techniques or other requirements. For instance, the wave-shaped profile may advantageously correspond to a triangular wave shape, an arcuate wave shape, a polygonal wave shape, an irregular wave shape, or any combination thereof. The undulations 18 may be regularly formed, wherein the undulations 18 are uniform and continuous, or maybe be irregularly formed, wherein the undulations 18 are non-uniform and include various shapes, and may be non-continuous. In an alternative embodiment, trapezoidal or rectangular profiles are also contemplated.

As shown in FIG. 3, the housing of the air-handling unit may further include a seal face 20 formed within the passageway 10, and configured to provide a contact surface for the sealing element 8 when the control damper 2 is in a closed position. Favorable results have been obtained when the seal face 20 of the passageway 10 is made of a rigid polymeric material such as a polyethylene (PE), wherein materials commonly used to form the sealing elements 8 may slide along the seal face 20.

During a closing process, when the control damper 2 is rotated in a first direction, indicated by the counterclockwise arrow in FIG. 2, the undulations 18 of the lip 16 initially contact the seal face 20 of the passageway 10 of the housing during an intermediate step. During the intermediate step, a flow of fluid through the passageway 10 is steadily decreased. The residual cross-section created by the undulations 18 of the lip 16 for the flow of the fluid between the undulations 18 and the seal face 20 prevents the force acting on the second sub-region 14 from increasing to a level that would cause the second sub-region 14 to move away from the seal face 20 and generate noise.

As the control damper 2 continues to rotate in the first direction, the undulations 18 slide across the surface of the seal face 20. While sliding, the undulations 18 can be elastically deformed or bend to one side, thereby further reducing the cross-section of the passageway 10 remaining open for the fluid to flow.

As the control damper 2 continues to rotate in the first direction, the second sub-region 14 of sealing element 8 contacts the seal face 20 and seals the passageway 10 entirely. The process of closing the passageway 10 is then completed.

Figure 4:
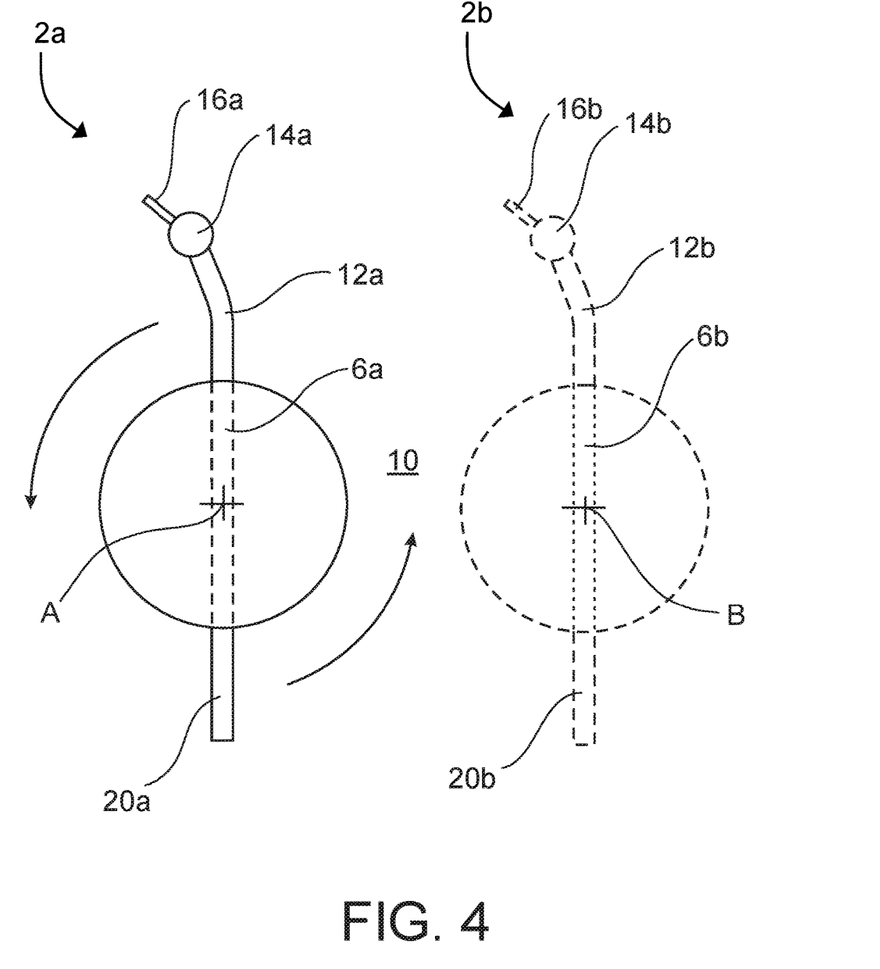
FIG. 4 is a side elevation view of a pair of control dampers according to another embodiment of the instant disclosure.
Figure 5:
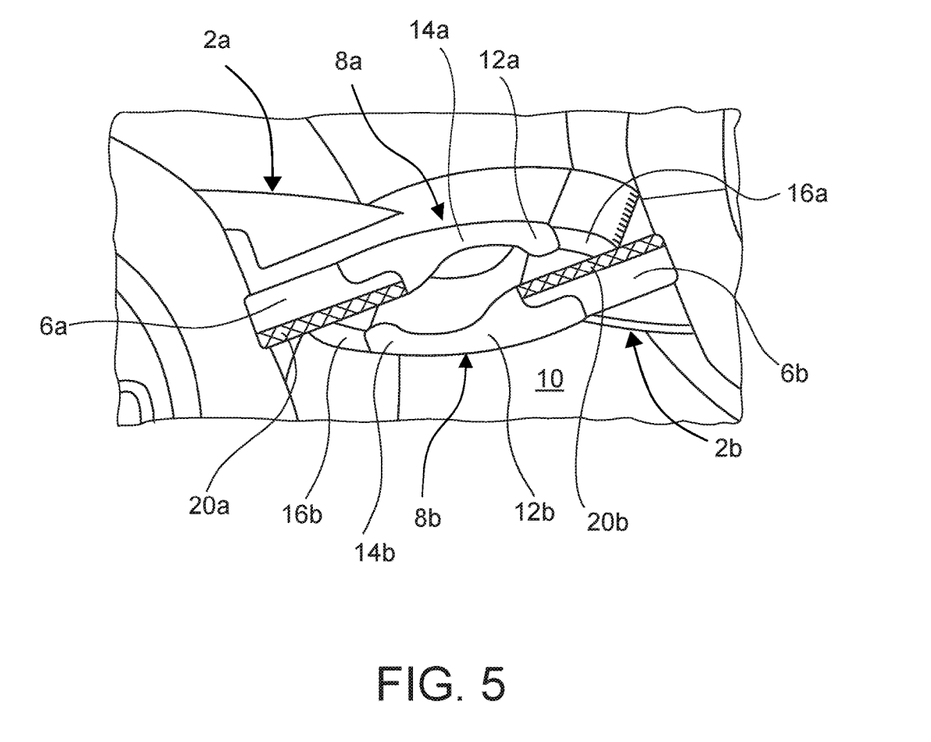
FIG. 5 is an enlarged, fragmentary perspective view of a pair of control dampers according to another embodiment of the instant disclosure.

In other air-handling units, a plurality of the control dampers 2a, 2b may be used to selectively open and close a single passageway 10, wherein the plurality of the control dampers 2a, 2b is disposed within the passageway 10, and the rotational axes A, B of the control dampers 2a, 2b are aligned substantially parallel to one another, as shown in FIGS. 4 and 5. The plurality of the control dampers 2a, 2b may be controlled by a drive system (not shown), with two adjacent ones of the plurality of the control dampers 2a, 2b rotating in opposite directions or in the same direction relative to one another, wherein the passageway 10 is closed when the sealing element 8b of a first one of the plurality of the control dampers 2b engages a seal face 20a of a second one of the plurality of the control dampers 2a.

In a first embodiment including the plurality of the control dampers 2a, 2b shown in FIG. 4, at least one of the plurality of the control dampers 2a, 2b may be embodied as having the sealing element 8a, 8b with the second sub-region 14a, 14b and the lip 16a, 16b extending from a first side of the main body 6a, 6b, while a second side of the main body 6a, 6b, formed on an opposite side of the rotational axis A, B from the first side of the main body 6a, 6b, includes the seal face 20a, 20b formed thereon.

When two of the plurality of the control dampers 2a, 2b are arranged side by side in the same orientation, as is shown with the second control damper 2b indicated by dashed lines, the passageway 10 can be closed by rotating each of the control dampers 2a, 2b counterclockwise. When rotated counterclockwise, the passageway 10 is closed when the second sub-region 14b of the second control damper 2b contacts the seal face 20a of the adjacent first control damper 2a. Particularly, the undulations 18b of the lip 16b of the second control damper 2b may initially contact the seal face 20a of the first control damper 2a. A residual cross-section of the passageway 10 between the undulations 18b of the lip 16b of the second control damper 2b and the seal face 20a of the first control damper 2a prevents the force acting on the second sub-region 14b of the second control damper 2b from increasing to a level that would cause the second sub-region 14b to move away from the seal face 20a and generate noise.

In alternate embodiments, more than two control dampers 2 may be provided within the passageway 10. It will be appreciated that the outermost ones of the control dampers 2 would include sealing elements 8 configured to sealingly engage a seal face 20 formed on the passageway 10, for completely sealing the passageway 10. Alternatively, the seal faces 20 may be fixedly installed within the passageway 10, between the control dampers 2, and the second sub-regions 14a, 14b of two control dampers 2a, 2b may be rotated against the seal faces 20, thereby closing the passageway 10.

FIG. 5 shows yet another embodiment of the instant disclosure. Particularly, FIG. 5 shows a cross-section of two control dampers 2a, 2b and respective sealing elements 8a, 8b. The control dampers 2a, 2b are each rotatable about respective rotational axes A, B, and are structurally the same. However, unlike the control dampers 2a, 2b shown in FIG. 4, which have the same orientation as each other, the control dampers 2a, 2b of FIG. 5 are arranged as reverse mirror images of each other, and have opposing orientations. Accordingly the control dampers 2a, 2b shown in FIG. 5 are configured wherein the sealing elements 8a, 8b of the two control dampers 2a, 2b move toward one another when the control dampers 2a, 2b are rotated in a first direction to close the passageway 10 between the control dampers 2a, 2b.

In the embodiment of FIG. 5, the first control damper 2a and the second control damper 2b are arranged on parallel rotational axes A, B, not described in greater detail. As described with respect to the embodiment of the disclosure shown in FIGS. 2 and 3, each of the control dampers 2a, 2b includes one of the sealing elements 8a, 8b extending from a first side of the main body 6a, 6b, wherein the first side of the main body 6a, 6b extends radially outwardly from the rotational axis A, B in a first direction.

In the embodiment of FIG. 5, the control dampers 2a, 2b each further include a seal face 20a, 20b formed on the first side of the main body 6a, 6b. Accordingly, unlike the embodiment of FIG. 4, the seal face 20a, 20b and the sealing element 8a, 8b are both formed on the same side of the rotational axis A, B. Favorable results have been obtained when the seal face 20a, 20b is produced from a hard plastic, for example a polyethylene (PE). Comparable materials that enable the undulations 18a, 18b of the lip 16a, 16b of one of the control dampers 2a, 2b to slide over the seal face 20a, 20b of the other one of the control dampers 2a, 2b during a closing process may also be used.

Because the control dampers 2a, 2b are arranged as reverse mirror images of each other, the sealing elements 8a, 8b of the control dampers 2a, 2b are moved toward one another when each of the control dampers 2a, 2b are rotated in the first direction. Accordingly, the undulations 18a, 18b of the lip 16a, 16b of one of the control dampers 2a, 2b contacts the seal face 20a, 20b of the other of the control dampers 2a, 2b, beginning the process of sealing the passageway 10.

In this embodiment, as closure of the passageway 10 progresses, which is achieved by the control dampers 2a, 2b continuing to rotate toward one another, the undulations 18a, 18b of the lips 16a, 16b begin to deform to one side and slide over the surface of seal faces 20a, 20b until the second sub-regions 14a, 14b contacts the seal faces 20a, 20b and seal the passageway 10. When the second sub-regions 14a, 14b contact the seal faces 20a, 20b, the force urging the second sub-regions 14a, 14b against the seal faces 20a, 20b is sufficient to effect a secure, noise-free closure of the passageway 10.

Accordingly to the disclosure, the cross-section of the passageway 10 that remains for the flow of the fluid is progressively decreased during closure, without noise generation, until the opening is completely closed.

According to the disclosure of FIG. 5, the two control dampers 2a, 2b can be moved relative to one another, and the passageway 10 is sealed at two points at the same time, thereby further improving the seal tightness.

From the foregoing description, one ordinarily skilled in the art can easily ascertain the essential characteristics of this invention and, without departing from the spirit and scope thereof, can make various changes and modifications to the invention to adapt it to various usages and conditions.

The invention claimed is:

1. An arrangement for a housing of an air-handling unit comprising:
   a first control damper disposed in a passageway of the housing and rotatable about a first rotational axis, the first control damper having a sealing element extending radially outwardly from the first rotational axis in a first direction, wherein the sealing element includes a resilient lip having a series of undulations formed therein, wherein the sealing element includes a first sub-region and a second sub-region, and wherein the first sub-region is disposed intermediate the first rotational axis and the second sub-region; and
   a second control damper disposed in the passageway and rotatable about a second rotational axis, the second rotational axis parallel to the first rotational axis, the second control damper including a seal face extending radially outwardly from the second rotational axis in a second direction, the second direction opposite the first direction, wherein the resilient lip and the second sub-region of the first control damper contact the seal face of the second control damper in a closed position of the first control damper and the second control damper, and wherein the resilient lip of the first control damper contacts the seal face of the second control damper before the second sub-region of the first control damper contacts the seal face of the second control damper.

2. The arrangement of claim 1, wherein the arrangement is configurable in an open position and in the closed position, wherein in the open position the sealing element of the first control damper is spaced apart from the seal face of the second control damper.

3. The arrangement of claim 1, wherein the second control damper includes a sealing element extending radially outwardly from the second rotational axis in the first direction.

4. An arrangement for a housing of an air-handling unit comprising:
   a first control damper disposed in a passageway of the housing and rotatable about a first rotational axis, the first control damper having a first sealing element extending radially outwardly from the first rotational axis in a first direction, wherein the first sealing element includes a first resilient lip having a first series of undulations formed therein, wherein the first sealing element includes a first sub-region and a second sub-region, and wherein the first sub-region is disposed intermediate the first rotational axis and the second sub-region; and
   a second control damper disposed in the passageway and rotatable about a second rotational axis, the second rotational axis parallel to the first rotational axis, the second control damper including a second sealing element extending radially outwardly from the second rotational axis in a second direction opposite the first direction, wherein the second sealing element includes a second resilient lip having a second series of undulations formed therein, wherein the second control damper includes a seal face formed thereon, wherein the first resilient lip of the first control damper and the second sub-region of the first control damper contact the seal face of the second control damper in a closed position of the first control damper and the second control damper, and wherein the first resilient lip of the first control damper contacts the seal face of the second control damper before the second sub-region of the first control damper contacts the seal face of the second control damper.

5. The arrangement of claim 4, wherein the first control damper includes a seal face formed thereon.

6. The arrangement of claim 5, wherein the seal face of the first control damper is formed on a same side of the first rotational axis as the first sealing element, and the seal face of the second control damper is formed on a same side of the second rotational axis as the second sealing element.

7. The arrangement of claim 5, wherein in the closed position the second resilient lip of the second control damper contacts the seal face of the of the first control damper.

8. The arrangement of claim 4, wherein each of the first series of undulations and the second series of undulations are wave-shaped.

* * * * *